(No Model.)
H. L. ADEN, Jr.
WELL PIPE CLOSING CLAMP.
No. 323,098. Patented July 28, 1885.
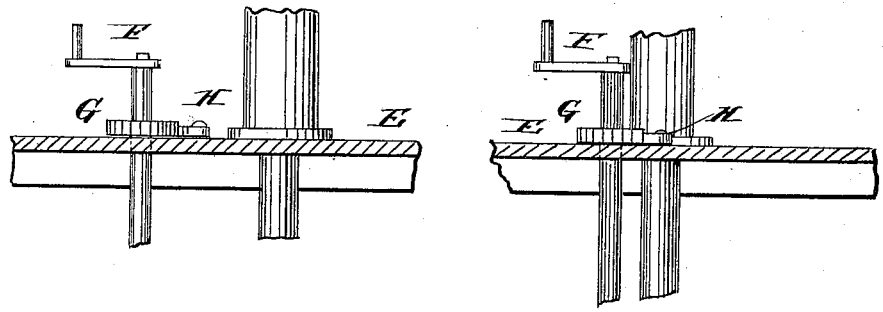
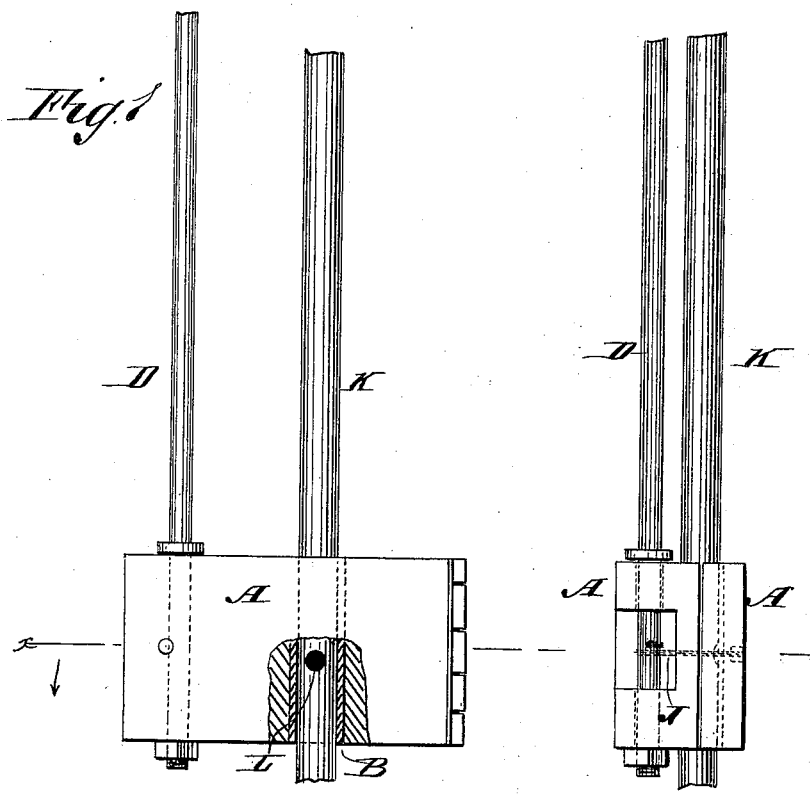
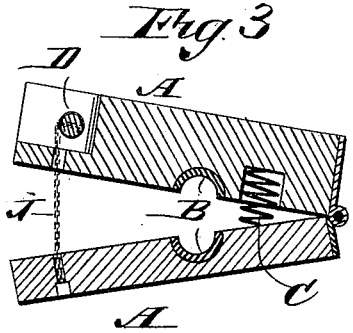
WITNESSES:
F. McArdle.
C. Sedgwick.
INVENTOR:
H. L. Aden Jr.
BY
ATTORNEYS.

UNITED STATES PATENT OFFICE.

HABBE L. ADEN, JR., OF RISING CITY, NEBRASKA.

WELL-PIPE-CLOSING CLAMP.

SPECIFICATION forming part of Letters Patent No. 323,098, dated July 28, 1885.

Application filed May 23, 1885. (No model.)

*To all whom it may concern:*

Be it known that I, HABBE L. ADEN, Jr., of Rising City, in the county of Butler and State of Nebraska, have invented a new and Improved Well-Pipe-Closing Clamp, of which the following is a full, clear, and exact description.

The object of my invention is to provide a new and improved clamp for closing the holes provided in well-tubes, to permit the water to flow out of the upper part of the pipe for the purpose of preventing freezing of the water in the pipes.

The invention consists in the combination, with two grooved blocks hinged together, of a shaft held to turn in the free end of one block, and a chain or cord secured to the said rod and to the free end of the other block, the said blocks being swung from each other by an interposed spring.

Reference is to be had to the accompanying drawings, forming part of this specification, in which similar letters of reference indicate corresponding parts in all the figures.

Figure 1 is a side view of my improved pipe-clamp applied and parts being broken out. Fig. 2 is an end view of the same. Fig. 3 is a sectional plan view of the clamp on the line $x$ $x$, Figs. 1 and 2, the clamp being open.

Two blocks, A, are hinged together at the ends, and are each provided on the inner side with a half-groove, B, extending from top to bottom, and lined with leather or rubber. A spring, C, is interposed between the two hinged blocks A, to swing them from each other.

In the free end of one block A a shaft or rod, D, is journaled, which extends up through the well-platform E, and has a hand wheel or crank, F, on its upper end. The said rod D also has a ratchet-wheel, G, with which a pawl, H, on the platform E engages. A chain or cord, J, is secured to the shaft or rod D and to the other block A.

The well-tube K, which extends down between the blocks A, has an aperture, L, at the said blocks. By turning the rod D in such a manner as to wind the chain or cord J on the rod D the blocks A are swung together, and the linings of the grooves in the blocks are pressed firmly against the tube K and close the aperture L, thus permitting of pumping water. After the desired quantity of water has been raised the shaft D is turned to unwind the cord or chain J, so as to permit the spring C to swing the blocks A from the tube K, whereby the aperture L is opened, and the water in the upper part of the tube K can flow off through the said aperture, thus preventing freezing.

Having thus described my invention, what I claim as new, and desire to secure by Letters Patent, is—

1. The combination, with a well-tube having an aperture in its side near the lower end, of hinged blocks held at the sides of the same, and a rod or shaft for swinging or pressing the blocks together extending up to the well-platform, substantially as herein shown and described.

2. The combination, with the grooved blocks A, hinged together, of a shaft or rod mounted to turn in the end of one block, and of a chain or cord secured to the said shaft or rod and to the end of the other block, substantially as herein shown and described.

3. The combination, with the hinged grooved blocks A, of the spring C, the shaft or rod D in one block, and the chain or cord J, secured to the said shaft and to the free end of the other block, substantially as herein shown and described.

HABBE L. ADEN, JR.

Witnesses:
J. H. PHILPOTT,
E. GRUBB.